United States Patent [19]

Ogawa et al.

[11] 4,387,757

[45] Jun. 14, 1983

[54] PNEUMATIC TIRES

[75] Inventors: Masaki Ogawa, Sayama; Mikihiko Ikegami, Tokorozawa, both of Japan

[73] Assignee: Bridgestone Tire Company Limited, Tokyo, Japan

[21] Appl. No.: 302,937

[22] Filed: Sep. 16, 1981

[30] Foreign Application Priority Data

Sep. 20, 1980 [JP] Japan ............................ 55-130077

[51] Int. Cl.³ ...................... B60C 11/00; B60C 1/00
[52] U.S. Cl. ............................. 152/209 R; 152/374; 526/340
[58] Field of Search ................ 152/209, 330, 374; 526/340

[56] References Cited

U.S. PATENT DOCUMENTS 4,334,567  6/1982  Bond .......................... 152/209 R

FOREIGN PATENT DOCUMENTS

| 1212386 | 11/1970 | United Kingdom . |
| 1231657 | 5/1971 | United Kingdom . |
| 1261371 | 1/1972 | United Kingdom . |
| 1496359 | 12/1977 | United Kingdom . |
| 1461373 | 1/1979 | United Kingdom . |
| 2071117 | 9/1981 | United Kingdom . |

OTHER PUBLICATIONS

Blow, C. M., *Rubber Tech. & Manufacture*, CRC Press, 1971, pp. 89-93.
Haws et al, *Rubber Industry* 9 (3) 107, (Jun. 1975), "Second Generation Polymers", pp. 107-111.

*Primary Examiner*—Edward C. Kimlin
*Assistant Examiner*—Lois E. Boland

*Attorney, Agent, or Firm*—Sughrue, Mion, Zinn, Macpeak and Seas

[57] ABSTRACT

A pneumatic tire having a tread is disclosed, which comprises using in said tread a rubber composition containing 10 to 120 parts by weight of carbon black and 0.5 to 5 parts by weight of a vulcanizer based on 100 parts by weight of a novel styrene-butadiene copolymer rubber as defined below alone or a blend rubber of not less than 30 parts by weight of said copolymer rubber and not more than 70 parts by weight of the other diene rubber, said styrene-butadiene copolymer rubber being obtained by random copolymerization of styrene with 1,3-butadiene and satisfying the following requirements:

(1) a content of bound styrene is 10 to 30% by weight;
(2) a content of 1,2-bond in butadiene portion is 42 to 70% by weight;
(3) a content of trans-1,4 bond in butadiene portion is not less than 25% by weight;
(4) a value obtained by subtracting a content of cis-1,4 bond in butadiene portion from said content of trans-1,4 bond is not less than 8% by weight;
(5) a relation between said content of bound styrene and said content of 1,2-bond is $65 \leq 1.7 \times$ the content of bound styrene (% by weight) + the content of 1,2-bond (% by weight) $\leq 100$;
(6) a weight mean molecular weight $(\overline{M}_w)$ is $35 \times 10^4$ to $65 \times 10^4$;
(7) a ratio of weight mean molecular weight $(\overline{M}_w)$ to number mean molecular weight $(\overline{M}_n)$ is not more than 2.3;
(8) the number of peaks in molecular weight distribution curve is not less than 2; and
(9) a relation between said weight mean molecular weight and said content of trans-1,4 bond is $75 \leq \overline{M}_w \times 10^{-4} + 1.3 \times$ the content of trans-1,4 bond (% by weight) $\leq 120$.

3 Claims, No Drawings

PNEUMATIC TIRES

This invention relates to pneumatic tires, and more particularly to pneumatic tires which are good in the workability and can simultaneously and remarkably improve wet skid resistance, rolling resistance, fracture resistance, wear resistance and uneven-wear resistance by using in a tread a rubber composition containing a novel styrene-butadiene copolymer rubber.

Styrene-butadiene copolymer rubbers have widely been used in a tread for tires owing to an excellent wet skid resistance on a wet road and a good wear resistance. However, the energy loss is large and the heat generation is apt to occur, so that these rubbers are hardly applied to large-size pneumatic tires.

On the other hand, the wet skid resistance becomes important in the large-size pneumatic tire with the popularization of expressways. Furthermore, in relatively small-size pneumatic tires previously using the styrene-butadiene copolymer rubber, it is significant to reduce the energy loss or rolling resistance from viewpoint of recent resource and energy savings. Therefore, it is strongly demanded to develop novel rubbers which have an excellent wet skid resistance and a small energy loss and can be used in both the large-size and small-size tires. For this purpose, there have been proposed so-called high vinyl polybutadiene rubbers or high vinyl styrene-butadiene copolymer rubbers, which contain 50-90% by weight of 1,2-bond. However, when these rubbers are applied to a tread of a tire, the wet skid resistance and rolling resistance are certainly improved to some extent, while the wear resistance, fracture resistance and the like are considerably degraded in case of the high vinyl polybutadiene rubber and are fairly degraded in case of the high vinyl styrene-butadiene copolymer rubber likewise the high vinyl polybutadiene rubber. Therefore, when such a tire is used under slightly severe conditions, wear rapidly occurs, so that this tire is considerably unfavorable for use in practice.

In order to solve the above mentioned drawbacks, the inventors have previously investigated the content of 1,2-bond of 25-45% by weight and the interaction between the micro structures in the styrene-butadiene copolymer rubber in the specification of Japanese patent application No. 124,662/80 filed Sept. 10, 1980. That is, it has hitherto been considered that since the improvement of wet skid resistance is contrary to the reduction of rolling resistance, it is relatively difficult to simultaneously solve such a contrary performances. This is due to the fact that there are watched only factors having a most influence on each performance. However, many primary properties (e.g. content of cis-1,4 bond, content of bound styrene and the like) are naturally concerned in one of performances, so that the use of styrene-butadiene copolymer rubbers considering overall viewpoints on these primary properties as a tread for tires has been proposed in the aforementioned previous patent application. However, such copolymer rubbers make possible to simultaneously improve the wet skid resistance, rolling resistance and wear resistance, but a merit inherent to the conventional styrene-butadiene copolymer or an excellent uneven-wear resistance is lost. As a result, it is ascertained that when the tire using the above copolymer rubber is run over a period of long time, uneven wearing phenomenon gradually appears.

Namely, there are not yet realized pneumatic tires, which have all of excellent wet skid resistance, rolling resistance, fracture resistance, wear resistance and uneven-wear resistance and a good workability and are very useful in practical use, up to present.

With the foregoing in mind, the inventors have further made various studies with respect to the aforementioned primary properties in order to simultaneously improve the wet skid resistance, rolling resistance, fracture resistance, wear resistance and uneven-wear resistance of the tire using styrene-butadiene copolymer rubber and found out that pneumatic tires satisfying all of the above performances can be obtained when the tread of the tire is constituted with a rubber composition containing a novel styrene-butadiene copolymer rubber simultaneously satisfying further particular requirements, and as a result, the invention has been accomplished.

That is, according to the invention, there is the provision of a pneumatic tire having a tread, which comprises using in said tread a rubber composition containing 10 to 120 parts by weight of carbon black and 0.5 to 5 parts by weight of a vulcanizer based on 100 parts by weight of a novel styrene-butadiene copolymer rubber as defined below alone or a blend rubber of not less than 30 parts by weight of said copolymer rubber and not more than 70 parts by weight of another diene rubber, said styrene-butadiene copolymer rubber being obtained by random copolymerization of styrene with 1,3-butadiene and satisfying the following requirements:

(1) a content of bound styrene is 10 to 30% by weight;

(2) a content of 1,2-bond in butadiene portion is 42 to 70% by weight;

(3) a content of trans-1,4 bond in butadiene portion is not less than 25% by weight;

(4) a value obtained by subtracting a content of cis-1,4 bond in butadiene portion from said content of trans-1,4 bond is not less than 8% by weight;

(5) a relation between said content of bound styrene and said content of 1,2-bond is $65 \leq 1.7 \times$ the content of bound styrene (% by weight) + the content of 1,2-bond (% by weight) $\leq 100$;

(6) a weight mean molecular weight ($\overline{M}_w$) is $35 \times 10^4$ to $65 \times 10^4$;

(7) a ratio of weight mean molecular weight ($\overline{M}_w$) to number mean molecular weight ($\overline{M}_n$) is not more than 2.3;

(8) the number of peaks in molecular weight distribution curve is not less than 2; and (9) a relation between said weight mean molecular weight and said content of trans-1,4 bond is $75 \leq \overline{M}_w \times 10^{-4} + 1.3 \times$ the content of trans-1,4 bond (% by weight) $\leq 120$.

As apparent from the specification of the aforementioned previous patent application, it is necessary that the ratio ($\overline{M}_w/\overline{M}_n$) of weight mean molecular weight to number mean molecular weight as to the molecular weight distribution is not more than 2.3 in order to simultaneously improve the wet skid resistance and rolling resistance and provide a satisfactory wet resistance. In this connection, even in the styrene-butadiene copolymer rubber to be used in the pneumatic tire according to the invention, the ratio $\overline{M}_w/\overline{M}_n$ should be not more than 2.3, preferably not more than 2.1. However, when the molecular weight distribution is made sharp as described above, the copolymer rubber inversely tends to cause uneven wear.

Therefore, in order to solve the above uneven wear phenomenon, it is necessary to increase the content of 1,2-bond in butadiene portion of the copolymer rubber. In this case, the larger the content of 1,2-bond, it is more advantageous to satisfy both the wet skid resistance and rolling resistance. However, when the content of 1,2-bond is too large, the interaction with carbon black becomes small, so that the strength at rupture and wear resistance of the copolymer rubber are apt to considerably lower. Since an optimum value is existent in the content of 1,2-bond, therefore, in the copolymer rubber according to the invention, it is necessary that the content of 1,2-bond is 42 to 70% by weight, preferably 45 to 60% by weight in connection with the other primary properties.

As mentioned above, it is necessary to increase the content of 1,2-bond in the copolymer rubber, which means that the content of bound styrene may be reduced in order to simultaneously improve the wet skid resistance and rolling resistance as apparent from the following reasons. Here, the bound styrene is closely related to the strength at rupture and density of the above copolymer rubber. That is, when the content of bound styrene is up to about 35% by weight, if styrene is randomly distributed, the strength at rupture of the copolymer rubber becomes higher in proportion to the content of bound styrene. On the other hand, viewing from the energy loss, the larger the content of bound styrene, the larger the energy loss of the copolymer rubber, so that the content of bound styrene is preferable to be made small as far as possible and is 30% by weight at most. However, considering the synergistic effect with trans-1,4 bond as mentioned below, the content of bound styrene according to the invention is necessary to be at least 10% by weight. Therefore, in the copolymer rubber according to the invention, the content of bound styrene is 10 to 30% by weight, preferably 15 to 25% by weight. Moreover, the term "random distribution" used herein means that a block content of bound styrene is not more than 10% by weight when measuring by an oxidative destruction process as described by I. M. Kolthoff et al in J. Polymer Sci., 1, 429 (1946).

In the copolymer rubber according to the invention, the content of 1,2-bond is made relatively large and the content of bound styrene is made relatively small in order to simultaneously improve the wet skid resistance and rolling resistance and further improve the uneven-wear resistance as previously mentioned. As a result, the strength at rupture and wear resistance are apt to lower. Therefore, in order to solve this drawback, the weight mean molecular weight ($\overline{M}_w$) should be made larger, so that the copolymer rubber according to the invention is necessary to have $\overline{M}_w$ of not less than $35 \times 10^4$. However, when $\overline{M}_w$ becomes larger than about $55 \times 10^4$, the workability such as kneading or the like rapidly degrades, while when $\overline{M}_w$ exceeds $65 \times 10^4$, the workability degrades to such an extent that the copolymer rubber cannot be applied to practical use. Thus, in the copolymer rubber according to the invention, $\overline{M}_w$ is $35 \times 10^4$ to $65 \times 10^4$, preferably $45 \times 10^4$ to $55 \times 10^4$.

Since the strength at rupture and wear resistance of the copolymer rubber according to the invention are improved by increasing the molecular weight as mentioned above, the workability is somewhat degraded as compared with the conventional case. However, the improvement of the workability is an absolutely indispensable factor in view of the productivity. In order to improve the workability, it is usually sufficient to make the molecular weight distribution broad, which is entirely contradictory to the case that the wear resistance is improved by making the molecular weight distribution sharp as previously mentioned. Therefore, in order to simultaneously improve the workability and wear resistance, a peak of the molecular weight distribution curve should be not less than 2 in the copolymer rubber according to the invention. As a method of obtaining the copolymer rubber satisfying such a requirement, there is a method wherein copolymer rubbers having a very sharp molecular weight distribution and a different $\overline{M}_w$ are blended with each other to make the ratio $\overline{M}_w/\overline{M}_n$ to not less than 2.3 as a whole, but there have also been known the methods disclosed in Japanese Patent Application Publication No. 14,172/67 and No. 4,996/69 and the like.

Furthermore, the relation between the content of bound styrene and the content of 1,2-bond is a great factor contributing to the wet skid resistance and rolling resistance. Particularly, the content of bound styrene gives a greater contribution and can be considered independently because it is represented as % by weight of the copolymer rubber, but the change of the content of bound styrene changes the content of butadiene. Since the content of 1,2-bond is represented as % by weight of butadiene portion, it is apparently influenced by the content of bound styrene. Therefore, the requirement satisfying both the wet skid resistance and rolling resistance is represented by the content of bound styrene and the content of 1,2-bond as a function of the content of bound styrene. As a result of examinations, it has been found that in the copolymer rubber wherein the content of bound styrene is 10 to 35% by weight, the content of 1,2-bond in butadiene portion is 25 to 80% by weight, the content of trans-1,4 bond is not less than 20% by weight and the ratio $\overline{M}_w/\overline{M}_n$ is not more than 2.5, the above requirement can be approximated by the following equation:

$$65 \leq 1.7 \times \text{content of bound styrene (\% by weight)} + \text{content of 1,2-bond (\% by weight)} \leq 100$$

That is, when the contents of bound styrene and 1,2-bond are within the above defined range, the wet skid resistance and rolling resistance can simultaneously be satisfied. When the value is less than 65, the wet skid resistance deteriorates and is never improved even when changing the other factors such as the content of trans-1,4 bond and the like. While, when the value exceeds 100, even if the other factors are changed, the rolling resistance cannot be improved.

In butadiene portion, trans-1,4 bond is largely concerned in the wear resistance of the copolymer rubber. That is, the larger the trans-1,4 bond, the more the improvement of the wear resistance. Such a phenomenon is peculiar to the styrene-butadiene copolymer rubber wherein the content of 1,2-bond is relatively large and the content of bound styrene is not less than 10% by weight. Inversely, the wear resistance is degraded when the content of bound styrene is less than 10% by weight or in case of butadiene homopolymers containing no styrene. In the copolymer rubber according to the invention, the content of trans-1,4 bond is necessary to be at least 25% by weight. Furthermore, the above phenomenon is produced by the balance with cis-1,4 bond, so that when the cis-1,4 bond is too large, it is not favorable in order to sufficiently develop the effect of improving the wear resistance by the trans-1,4 bond. Thus, in the copolymer rubber according to the invention, it is necessary that a value obtained by subtracting the content of cis-1,4 bond from the content of trans-1,4 bond is not less than 8% by weight, preferably not less than 10% by weight.

Since the trans-1,4 bond is largely related to the wear resistance as mentioned above, when the content of trans-1,4 bond becomes larger, other primary properties such as the content of 1,2-bond and the like are restricted, and as a result the improvement of the wet skid resistance and rolling resistance is also restricted. However, the trans-1,4 bond is interchangeable with $\overline{M}_w$ relating to the wear resistance, so that it has been confirmed that even when the content of trans-1,4 bond is as small as possible, if $\overline{M}_w$ is made large, the wear resistance can be improved satisfactorily. In this connection, when the trans-1,4 bond is minutely compared with $\overline{M}_w$, the trans-1,4 bond has a larger contribution to wear resistance. As a result, in the styrene-butadiene copolymer wherein the ratio $\overline{M}_w/\overline{M}_n$ is not more than 2.5 in order to improve the wear resistance, it has been found that the relation between the content of trans-1,4 bond and $\overline{M}_w$ can be approximated by the following equation:

$$75 \leq \overline{M}_w \times 10^{-4} + 1.3 \times \text{content of trans-1,4 bond (\% by weight)} \leq 120$$

That is, when the above relation is within the above defined range, the wear resistance can statisfactorily be satisfied. When the value is less than 75, the wear resistance is insufficient, while when the value exceeds 120, the workability deteriorates or the content of trans-1,4 bond becomes excessive and hence the content of 1,2-bond fairly reduces.

According to the invention, the novel copolymer rubber as mentioned above may be used alone in the tread of the tire or, if necessary, may be blended with not more than 70 parts by weight, preferably not more than 50 parts by weight, based on 100 parts by weight of total rubber content, of another diene rubber such as natural rubber, polybutadiene rubber, synthetic polyisoprene rubber, butadieneacrylonitrile copolymer rubber, styrene-butadiene copolymer rubber other than the above defined copolymer rubber and the like.

Moreover, the above novel copolymer rubber is, for example, prepared as follows: that is, 25 kg of cyclohexane, 1.3 kg of styrene, 4.5 kg of 1,3-butadiene, 2.54 g of n-butyl lithium, 0.5 g of sodium dodecylbenzene sulfonate and 1.7 g of ethylene glycol dimethyl ether are charged into a reaction vessel of 50 l capacity and polymerized therein at a polymerization temperature of 52.5° C. under a nitrogen atmosphere for 1.3 hours, to which is added 4 g of stannic chloride and thereafter the resulting mixture is maintained at a temperature of 45° C. for 18 hours. Then, after 100 g of 2,6-di-t-butyl-p-cresol is added, the solvent is removed by stripping with steam and the resulting product is dried on a roll heated at 115° C. In this case, the content of 1,2-bond can be controlled by changing the polymerization temperature, while the content of trans-1,4 bond, the content of cis-1,4 bond and others can be controlled by changing the addition amounts of sodium dodecylbenzene sulfonate, ethylene glycol dimethyl ether and n-butyl lithium.

In the pneumatic tire according to the invention, the rubber composition to be used in the tread contains 10 to 120 parts by weight of carbon black and 0.5 to 5 parts by weight of a vulcanizer based on 100 parts by weight of the rubber. When the content of carbon black is less than 10 parts by weight, the reinforcing effect is less, while when the above content exceeds 120 parts by weight, the workability such as kneading or the like is deteriorated. On the other hand, when the content of the vulcanizer is less than 0.5 part by weight, the vulcanizing effect cannot be expected sufficiently, while when the above content exceeds 5 parts by weight, the hardness is too high and the resulting vulcanized rubber is unsuitable for use in the tread. As the carbon black, it is preferable to use carbon black having an iodine adsorption value of not less than 36 mg/l and a dibutyl phthalate adsorption value of not less than 60 ml/100 g in order to more improve the wear resistance and reinforcing effect. As the vulcanizer, there is used at least one substance selected from sulfur, p-quinone dioxime, p,p'-dibenzoylquinone dioxime, 4,4'-dithiodimorpholine, poly-p-dinitrosobenzene, ammonium benzoate and alkylphenol disulfide. It is preferable to use one or more of sulfur, 4,4'-dithiodimorpholine and alkylphenol disulfide and the use of sulfur is most preferable.

In the pneumatic tire according to the invention, the rubber composition to be used in the tread may further contain an inorganic filler such as silica, bentonite, clay, titanium oxide, talc, china clay, diatomaceous earth, chalk or the like; a vulcanization accelerator such as N-oxydiethylene-2-benzothiazole sulfeneamide, di-2-benzothiazyl disulfide, N-cyclohexyl-2-benzothiazole sulfeneamide or the like; an accelerator activator such as zinc white, stearic acid or the like; a softener such as aromatic oil or the like; and an antioxidant such as N-phenyl-N'-isopropyl-p-phenylenediamine, phenyl-$\beta$-naphthylamine, 2-mercaptobenzimidazole or the like, each of which being added in an amount usually used in ordinary rubber industry, in addition to the above mentioned carbon black and vulcanizer.

The pneumatic tire according to the invention may be reinforced with organic fiber cords of nylon, vinylon, polyester, KEVLAR (trade name) and the like or inorganic fiber cords of steel, glass, carbon and the like. Furthermore, the carcass of this tire may take anyone of radial structure and bias structure, but it is preferably the radial structure.

According to the invention, the pneumatic tires having the above mentioned construction simultaneously and considerably improve the wet skid resistance, rolling resistance, fracture resistance, wear resistance, uneven-wear resistance and workability, so that they are very useful in practical use.

The invention will now be described in greater detail with reference to the following examples.

EXAMPLE 1

First of all, there were provided 34 kinds of styrene-butadiene copolymer rubbers as shown in the following Table 1. Then, 34 kinds of rubber compositions were prepared by adding 50 parts by weight of ISAF carbon black, 10 parts by weight of aromatic oil, 2 parts by weight of stearic acid, 1 part by weight of N-phenyl-N'-isopropyl-p-phenylenediamine, 4 parts by weight of zinc white, 0.6 part by weight of N-oxydiethylene-2-benzothiazole sulfeneamide, 0.8 part by weight of di-2-benzothiazyl disulfide and 1.5 parts by weight of sulfur to 100 parts of each of these styrene-butadiene copolymer rubbers. In each of these rubber compositions, the presence of roll buggy was evaluated as a workability at the kneading with a 10 inch roller and the strength at rupture (Tb) was evaluated according to a method of JIS K-6301. Thereafter, pneumatic tires having a tire size of 165 SR 13 were manufactured by using the above mentioned rubber composition in a tread and the wet skid resistance, rolling resistance, wear resistance and uneven-wear resistance thereof were evaluated to obtain results as shown in Table 1.

Moreover, the performance evaluation and the microstructure of styrene-butadiene copolymer rubber were measured as follows.

Wet skid resistance

A vehicle provided with the test tire was run on a wet concrete road having a water level of 3 mm at a speed of 80 km/hr and then subjected to rapid braking at the above speed. Then, a running distance required for completely stopping the vehicle was measured. When a tire using the styrene-butadiene copolymer rubber of Sample No. 34 of Table 1 is a control tire, the wet skid resistance of the test tire was evaluated by the following equation:

$$\frac{\left(\begin{array}{c}\text{Running distance}\\\text{of control tire}\end{array}\right) - \left(\begin{array}{c}\text{Running distance}\\\text{of test tire}\end{array}\right)}{(\text{Running distance of control tire})} \times 100$$

Rolling resistance

The test tire subjected to an internal pressure of 1.7 kg/cm$^2$ was trained on a steel drum with a diameter of 1,707.6 mm and a width of 350 mm, which was rotated by the driving of a motor, at a speed of 80 km/hr under a JIS 100% load (385 kg) for 30 minutes and thereafter the rotating speed of the drum was raised to 100 km/hr. Then, the driving of the motor was stopped to run the drum by inertia, during which the rolling resistance of the tire to the drum at a speed of 50 km/hr was measured on a basis of deceleration speed of drum and time change. Next, a net rolling resistance of the tire was determined by subtracting the previously calculated drum resistance from the measured value. Moreover, the rolling resistance of the test tire was evaluated by the following equation likewise the evaluation of the wet skid resistance:

$$\frac{\left(\begin{array}{c}\text{Rolling resistance}\\\text{of control tire}\end{array}\right) - \left(\begin{array}{c}\text{Rolling resistance}\\\text{of test tire}\end{array}\right)}{(\text{Rolling resistance of control tire})} \times 100$$

Wear resistance

After the test tire was run over a distance of 10,000 km, the depth of the remaining tread groove was measured, from which a running distance required for wearing the tread only by 1 mm was calculated and defined as a wear resistance by an index on the basis that the control tire is 100. The larger the index value, the better the wear resistance.

Uneven-wear resistance

After the test tire was run over a distance of 20,000 km, the appearance of the tire was observed to measure the presence of uneven wear.

Microstructure

The content of bound styrene was measured by means of a spectrophotometer using an absorbance of 699 cm$^{-1}$, and the microstructures in butadiene portion were measured by a D. Morero's method [Chem. & Ind., 41, 758 (1959)]. Further, the ratio $M_w/M_n$ was measured in a solution of 0.5 g/100 ml of tetrahydrofuran by means of a measuring apparatus, Waters GPC 200.

TABLE 1(a)

| Microstructure | | 1 Example | 2 Example | 3 Example | 4 Example | 5 Example | 6 Example | 7 Example |
|---|---|---|---|---|---|---|---|---|
| Content of bound styrene | (wt. %) | 20.7 | 20.2 | 20.5 | 11.0 | 28.5 | 25.0 | 15.0 |
| Content of trans-1,4 bond | (wt. %) | 34 | 28 | 27 | 26 | 35 | 36 | 25 |
| Content of cis-1,4 bond | (wt. %) | 21 | 17 | 19 | 11 | 20 | 21 | 7 |
| Content of trans-1,4 bond − Content of cis-1,4 bond | (wt. %) | 13 | 11 | 8 | 15 | 15 | 15 | 18 |
| Content of 1,2-bond | (wt. %) | 45 | 55 | 54 | 63 | 45 | 43 | 68 |
| $\bar{M}_w \times 10^4$ | | 43.2 | 49.7 | 45.0 | 47.3 | 41.3 | 48.8 | 48.5 |
| $\bar{M}_w/\bar{M}_n$ | | 1.6 | 1.8 | 2.2 | 1.9 | 1.8 | 1.6 | 1.7 |
| 1.7 × Content of bound styrene (wt. %) + Content of 1,2-bond (wt. %) | | 80.2 | 89.3 | 88.9 | 81.7 | 93.5 | 85.5 | 93.5 |
| $\bar{M}_w \times 10^{-4}$ + 1.3 × Content of trans-1,4 bond (wt. %) | | 87.4 | 86.1 | 80.0 | 81.1 | 86.5 | 95.6 | 81.0 |
| Number of peaks | | 2 | 2 | 2 | 2 | 2 | 2 | 2 |
| Results | | | | | | | | |
| Workability | | none | none | none | none | none | none | none |
| Strength at rupture | (kg/cm$^2$) | 235 | 227 | 225 | 200 | 234 | 213 | 246 |
| Wet skid resistance | (%) | +12 | +16 | +11 | +1 | +21 | +8 | +10 |
| Rolling resistance | (%) | +16 | +14 | +13 | +17 | +2 | +2 | +8 |
| Wear resistance | (index) | 105 | 102 | 100 | 100 | 104 | 102 | 100 |
| Uneven-wear resistance | | none | none | none | none | none | none | none |

TABLE 1(b)

| Microstructure | | 8 Example | 9 Example | 10 Example | 11 Example | 12 Example | 13 Example | 14 Example |
|---|---|---|---|---|---|---|---|---|
| Content of bound styrene | (wt. %) | 20.5 | 20.3 | 14.5 | 25.0 | 22.6 | 19.8 | 20.0 |
| Content of trans-1,4 bond | (wt. %) | 35 | 32 | 33 | 29 | 32 | 48.5 | 32 |
| Content of cis-1,4 bond | (wt. %) | 16 | 18 | 24 | 15.5 | 21 | 8.5 | 20 |
| Content of trans-1,4 bond − Content of | | | | | | | | |

TABLE 1(b)-continued

| Microstructure | | 8 Example | 9 Example | 10 Example | 11 Example | 12 Example | 13 Example | 14 Example |
|---|---|---|---|---|---|---|---|---|
| cis-1,4 bond | (wt. %) | 19 | 14 | 9 | 13.5 | 11 | 40 | 12 |
| Content of 1,2-bond | (wt. %) | 49 | 50 | 43 | 55.5 | 47 | 43 | 48 |
| $\bar{M}_w \times 10^4$ | | 36.0 | 62.0 | 45.0 | 46.0 | 35.0 | 55.0 | 45.0 |
| $\bar{M}_w/\bar{M}_n$ | | 1.7 | 1.9 | 1.7 | 1.7 | 1.8 | 1.9 | 2.3 |
| 1.7 × Content of bound styrene (wt. %) + Content of 1,2-bond (wt. %) | | 83.9 | 84.5 | 67.7 | 98.0 | 85.4 | 76.7 | 82.0 |
| $\bar{M}_w \times 10^{-4}$ + 1.3 × Content of trans-1,4 bond (wt. %) | | 81.5 | 97.6 | 103.5 | 83.7 | 76.0 | 118 | 86.6 |
| Number of peaks | | 2 | 2 | 2 | 2 | 2 | 2 | 2 |
| Results | | | | | | | | |
| Workability | | none | slightly presence | none | none | none | none | none |
| Strength at rupture | (kg/cm²) | 205 | 235 | 203 | 223 | 208 | 228 | 208 |
| Wet skid resistance | (%) | +14 | +14 | +1 | +22 | +13 | +5 | +5 |
| Rolling resistance | (%) | +14 | +16 | +7 | +1 | +12 | +16 | +2 |
| Wear resistance | (index) | 102 | 125 | 101 | 108 | 103 | 129 | 109 |
| Uneven-wear resistance | | none | none | none | none | none | none | none |

TABLE 1(c)

| Microstructure | | 15 Example | 16 Example | 17 Comparative Example | 18 Comparative Example | 19 Comparative Example | 20 Comparative Example | 21 Comparative Example |
|---|---|---|---|---|---|---|---|---|
| Content of bound styrene | (wt. %) | 20.7 | 21.2 | 20.6 | 20.1 | 20.3 | 9.5 | 32.0 |
| Content of trans-1,4 bond | (wt. %) | 33 | 31 | 27 | 24 | 29 | 26 | 34 |
| Content of cis-1,4 bond | (wt. %) | 18 | 22 | 17 | 16 | 23 | 11 | 23 |
| Content of trans-1,4 bond − Content of cis-1,4 bond | (wt. %) | 15 | 9 | 10 | 8 | 6 | 9 | 11 |
| Content of 1,2-bond | (wt. %) | 49 | 47 | 56 | 60 | 48 | 63 | 43 |
| $\bar{M}_w \times 10^4$ | | 43.5 | 44.0 | 47.0 | 48.2 | 47.7 | 46.2 | 46.7 |
| $\bar{M}_w/\bar{M}_n$ | | 1.7 | 2.1 | 1.3 | 1.8 | 1.7 | 2.0 | 2.0 |
| 1.7 × Content of bound styrene (wt. %) + Content of 1,2-bond (wt. %) | | 84.2 | 83.0 | 91.0 | 94.2 | 82.5 | 79.2 | 97.2 |
| $\bar{M}_w \times 10^{-4}$ + 1.3 × Content of trans-1,4 bond (wt. %) | | 86.4 | 84.3 | 82.1 | 79.4 | 85.4 | 80.0 | 90.2 |
| Number of peaks | | 2 | 3 | 1 | 2 | 2 | 2 | 2 |
| Results | | | | | | | | |
| Workability | | none | none | presence | none | none | none | none |
| Strength at rupture | (kg/cm²) | 224 | 236 | 198 | 206 | 218 | 184 | 233 |
| Wet skid resistance | (%) | +12 | +13 | +10 | +12 | +8 | −7 | +23 |
| Rolling resistance | (%) | +16 | +16 | +9 | +6 | +13 | +18 | −8 |
| Wear resistance | (index) | 105 | 108 | 97 | 90 | 93 | 93 | 95 |
| Uneven-wear resistance | | none | none | none | none | none | none | none |

TABLE 1(d)

| Microstructure | | 22 Comparative Example | 23 Comparative Example | 24 Comparative Example | 25 Comparative Example | 26 Comparative Example | 27 Comparative Example | 28 Comparative Example |
|---|---|---|---|---|---|---|---|---|
| Content of bound styrene | (wt. %) | 25.0 | 13.0 | 20.2 | 20.3 | 12.3 | 28.4 | 21.5 |
| Content of trans-1,4 bond | (wt. %) | 36 | 18 | 33 | 31 | 35 | 28 | 28.5 |
| Content of cis-1,4 bond | (wt. %) | 24 | 10 | 17 | 17 | 22 | 18 | 18.5 |
| Content of trans-1,4 bond − Content of cis-1,4 bond | (wt. %) | 12 | 8 | 16 | 14 | 13 | 10 | 10 |
| Content of 1,2-bond | (wt. %) | 40 | 72 | 50 | 52 | 43 | 54 | 53 |
| $\bar{M}_w \times 10^4$ | | 45.2 | 39.0 | 34.0 | 66.5 | 47.1 | 47.3 | 28.1 |
| $\bar{M}_w/\bar{M}_n$ | | 1.7 | 1.6 | 1.8 | 2.1 | 1.8 | 1.7 | 2.1 |
| 1.7 × Content of bound sytrene (wt. %) + Content of 1,2-bond (wt. %) | | 82.5 | 94.1 | 84.3 | 86.5 | 63.9 | 102.3 | 89.6 |
| $\bar{M}_w \times 10^{-4}$ + 1.3 × Content of trans-1,4 bond (wt. %) | | 92.0 | 62.4 | 76.9 | 106.8 | 106.9 | 83.7 | 65.1 |
| Number of peaks | | 2 | 2 | 2 | 2 | 2 | 2 | 2 |
| Results | | | | | | | | |
| Workability | | none | none | none | presence | none | none | none |
| Strength at rupture | (kg/cm²) | 216 | 163 | 197 | 192 | 191 | 225 | 185 |
| Wet skid resistance | (%) | +7 | +6 | +13 | +2 | −4 | +24 | +16 |
| Rolling resistance | (%) | +3 | +4 | +14 | +13 | +7 | −6 | +10 |
| Wear resistance | (index) | 102 | 73 | 95 | 105 | 100 | 107 | 83 |
| Uneven-wear resistance | | presence | none | none | none | none | none | none |

TABLE 1(e)

| Microstructure | | Sample No. | | | | | |
|---|---|---|---|---|---|---|---|
| | | 29 Comparative Example | 30 Comparative Example | 31 Comparative Example | 32 Comparative Example | 33 Comparative Example | 34* Control |
| Content of bound styrene | (wt. %) | 20.8 | 21.5 | 20.5 | 20.3 | 20.2 | 23.5 |
| Content of trans-1,4 bond | (wt. %) | 30 | 50 | 31 | 30 | 30 | 66 |
| Content of cis-1,4 bond | (wt. %) | 22 | 10 | 22 | 22 | 18 | 15 |
| Content of trans-1,4 bond — Content of cis-1,4 bond | (wt. %) | 8 | 40 | 9 | 8 | 12 | 51 |
| Content of 1,2-bond | (wt. %) | 48 | 40 | 47 | 48 | 52 | 19 |
| $\overline{M}_w \times 10^4$ | | 35.2 | 56.5 | 43.2 | 47.1 | 45.3 | 34.8 |
| $\overline{M}_w/\overline{M}_n$ | | 1.9 | 1.9 | 2.5 | 3.0 | 1.8 | 3.5 |
| 1.7 × Content of bound styrene (wt. %) + Content of 1,2-bond (wt. %) | | 83.4 | 76.5 | 81.9 | 82.5 | 86.3 | 59.0 |
| $\overline{M}_w \times 10^{-4}$ + 1.3 × Content of trans-1,4 bond (wt. %) | | 74.2 | 121.5 | 83.5 | 86.1 | 84.3 | 120.6 |
| Number of peaks | | 2 | 2 | 2 | 2 | 1 | 1 |
| Results | | | | | | | |
| Workability | | none | none | none | none | presence | none |
| Strength at rupture | (kg/cm²) | 199 | 187 | 215 | 224 | 191 | 230 |
| Wet skid resistance | (%) | +14 | −8 | +6 | +7 | +10 | ±0 |
| Rolling resistance | (%) | +10 | +13 | −3 | −8 | +9 | ±0 |
| Wear resistance | (index) | 93 | 132 | 95 | 92 | 93 | 100 |
| Uneven-wear resistance | | none | none | none | none | none | none |

*SBR 1500

As apparent from Table 1, the pneumatic tires using in the tread the novel styrene-butadiene copolymer rubber according to the invention are considerably excellent in the wet skid resistance, rolling resistance, fracture resistance, wear resistance and uneven-wear resistance.

EXAMPLE 2

A rubber composition having a compounding recipe as shown in the following Table 2 was prepared, which was used in a tread of a pneumatic tire. The performances of the resulting tire were evaluated in the same manner as described in Example 1 to obtain results as shown in Table 2.

TABLE 2

| | | Comparative Example | Comparative Example | Example | Example | Example |
|---|---|---|---|---|---|---|
| Styrene-butadiene copolymer rubber SBR1500 | | | | | | 15 |
| Polybutadiene rubber BR01 | | | | | | 15 |
| Natural rubber | | 80 | 75 | 70 | 50 | 40 |
| Novel copolymer rubber (Sample No. 1) | | 20 | 25 | 30 | 50 | 30 |
| HAF carbon black | | 50 | 50 | 50 | 50 | 50 |
| Aromatic oil | | 10 | 10 | 10 | 10 | 10 |
| N—phenyl-N'—isopropyl-p-phenylenediamine | | 1 | 1 | 1 | 1 | 1 |
| Stearic acid | | 2 | 2 | 2 | 2 | 2 |
| Zinc white | | 4 | 4 | 4 | 4 | 4 |
| N—oxydiethylene-2-benzothiazole sulfeneamide | | 0.6 | 0.7 | 0.7 | 0.8 | 0.7 |
| di-2-benzothiazyl disulfide | | 0.2 | 0.2 | 0.2 | 0.2 | 0.2 |
| p-aminophenol disulfide | | 2.0 | 2.0 | 2.0 | 0.2 | 0.2 |
| Results | | | | | | |
| Strength at rupture (Tb) | (kg/cm²) | 254 | 246 | 225 | 219 | 220 |
| Wet skid resistance | (%) | −4 | −2 | +2 | +4 | +2 |
| Rolling resistance | (%) | +12 | +10 | +9 | +12 | +1 |
| Wear resistance | (index) | 98 | 99 | 101 | 109 | 102 |
| Uneven-wear resistance | | none | none | none | none | none |

From Table 2, it can be seen that the object of the invention can be achieved even when using the novel styrene-butadiene copolymer rubber in an amount of at least 30 parts by weight per 100 parts by weight of total rubber content.

What is claimed is:

1. A pneumatic tire having a tread, which comprises using in said tread a rubber composition containing 10 to 120 parts by weight of carbon black and 0.5 to 5 parts by weight of a vulcanizer based on 100 parts by weight of a novel styrene-butadiene copolymer rubber as defined below alone or a blend rubber of not less than 30 parts by weight of said copolymer rubber and not more than 70 parts by weight of another diene rubber, said styrene-butadiene copolymer rubber being obtained by random copolymerization of styrene with 1,3-butadiene and satisfying the following requirements:

(1) a content of bound styrene is 10 to 30% by weight;
(2) a content of 1,2-bond in butadiene portion is 42 to 70% by weight;
(3) a content of trans-1,4 bond in butadiene portion is not less than 25% by weight;
(4) a value obtained by subtracting a content of cis-1,4 bond in butadiene portion from said content of trans-1,4 bond is not less than 8% by weight;
(5) a relation between said content of bound styrene and said content of 1,2-bond is $65 \leq 1.7 \times$ the content of bound styrene (% by weight) + the content of 1,2-bond (% by weight) $\leq 100$;
(6) a weight mean molecular weight ($\overline{M}_w$) is $35 \times 10^4$ to $65 \times 10^4$;
(7) a ratio of weight mean molecular weight ($\overline{M}_w$) to number mean molecular weight ($\overline{M}_n$) is not more than 2.3;

(8) the number of peaks in molecular weight distribution curve is not less than 2; and
(9) a relation between said weight mean molecular weight and said content of trans-1,4 bond is $75 \leq \overline{M}_w \times 10^{-4} + 1.3 \times$ the content of trans-1,4 bond (% by weight) $\leq 120$.

2. A pneumatic tire according to claim 1, wherein said carbon black has an iodine adsorption value of not less than 36 mg/l and a dibutyl phthalate adsorption value of not less than 60 ml/100 g.

3. A pneumatic tire according to claim 1, wherein said vulcanizer is at least one substance selected from sulfur, p-quinone dioxime, p,p'-dibenzoylquinone dioxime, 4,4'-dithiodimorpholine, poly-p-dinitrosobenzene, ammonium benzoate and alkylphenol disulfide.

* * * * *